US007122219B2

(12) United States Patent
Houda et al.

(10) Patent No.: US 7,122,219 B2
(45) Date of Patent: Oct. 17, 2006

(54) ELECTRODE FOR GENERATION OF HYDROGEN

(75) Inventors: Hiroyoshi Houda, Nobeoka (JP); Yasuhide Noaki, Nobeoka (JP); Kentaro Sako, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 160 days.

(21) Appl. No.: 10/478,134

(22) PCT Filed: Mar. 20, 2003

(86) PCT No.: PCT/JP03/03423

§ 371 (c)(1),
(2), (4) Date: Nov. 20, 2003

(87) PCT Pub. No.: WO03/078694

PCT Pub. Date: Sep. 25, 2003

(65) Prior Publication Data

US 2004/0151896 A1 Aug. 5, 2004

(30) Foreign Application Priority Data

Mar. 20, 2002 (JP) ............................. 2002-077949

(51) Int. Cl.
*B05D 3/02* (2006.01)
*B05D 5/12* (2006.01)

(52) U.S. Cl. .................. 427/115; 427/125; 427/126.1; 427/383.3

(58) Field of Classification Search ................ 428/672, 428/673, 670, 669, 624; 205/766, 767; 455/58; 427/58, 115, 125, 585, 126.1, 372.2, 383.1, 427/383.3
See application file for complete search history.

(56) References Cited

U.S. PATENT DOCUMENTS

| | | | | |
|---|---|---|---|---|
| 4,443,317 A | * | 4/1984 | Kawashima et al. ...... | 204/290.1 |
| 4,528,084 A | * | 7/1985 | Beer et al. ............. | 204/290.08 |
| 4,586,998 A | * | 5/1986 | Wood ......................... | 204/252 |
| 4,765,879 A | | 8/1988 | Matsumoto | |
| 4,900,419 A | * | 2/1990 | Nishiki et al. ......... | 204/290.04 |
| 5,645,930 A | * | 7/1997 | Tsou ......................... | 428/328 |
| 5,882,723 A | | 3/1999 | Tsou ......................... | 427/125 |

FOREIGN PATENT DOCUMENTS

| | | |
|---|---|---|
| EP | 0 129 734 B1 | 1/1990 |
| EP | 0 298 055 B1 | 3/1991 |
| JP | 3-75635 B2 | 12/1991 |
| JP | 6-33481 B2 | 5/1994 |
| JP | 6-33492 B2 | 5/1994 |
| JP | 11-140680 A | 5/1999 |
| JP | 11-158678 A | 6/1999 |
| JP | 11-229170 A | 8/1999 |
| JP | 2002-317289 A | 10/2002 |
| KR | 29899 B1 | 7/1989 |
| WO | WO 01-28714 A1 | 4/2001 |

* cited by examiner

*Primary Examiner*—Michael E. Lavilla
(74) *Attorney, Agent, or Firm*—Birch, Stewart, Kolasch & Birch, LLP

(57) ABSTRACT

An electrode for use in hydrogen generation comprising a conductive base and a coating layer formed thereon of a composition obtainable by thermally decomposing, in the presence of an organic acid, a mixture comprising at least one type of platinum compound.

5 Claims, 5 Drawing Sheets

ELECTRODE FOR GENERATION OF HYDROGEN

This application is the national phase under 35 U.S.C. § 371 of PCT International Application No. PCT/JP03/03423 which has an International filing date of Mar. 20, 2003, which designated the United States of America.

TECHNICAL FIELD

The present invention relates to an electrode for use in electrolysis, in particular, an electrode for use in hydrogen generation which is suitably used in the electrolysis of sodium chloride based on an ion exchange membrane method and which exhibits a low overvoltage over a long period of time.

BACKGROUND ART

In the process of the electrolysis of sodium chloride based on an ion exchange membrane method, the reduction of energy consumption is one of the most important issues. A detailed analysis of the voltage involved in the electrolysis of sodium chloride based on an ion exchange membrane method shows that the voltage includes, in addition to the theoretically required voltage, the voltage due to the ion exchange membrane, the overvoltages of the anode and cathode, and the voltage dependent on the distance between the anode and cathode in the electrolysis vessel.

As for the overvoltages of the electrodes among these various voltages, as far as the overvoltage of the anode is concerned, the so-called insoluble electrode referred to as the DSA (Dimension Stable Anode), provided with a coating layer of a platinum group oxide, reduces the overvoltage to a level lower than 50 mV or less such that no further improvement can be expected.

On the other hand, as far as the cathode is concerned, such conventionally used materials as mild steel, stainless steel and nickel exhibit overvoltages ranging from 300 to 400 mV. Accordingly, the activation of the surfaces of these materials has been studied for the purpose of reducing the overvoltages.

Examples include a highly active cathode produced from an oxide by thermal spraying of nickel oxide, cathodes utilizing Raney nickel based metals, cathodes taking advantage of composite plating with nickel and tin, and cathodes based on composite plating of active charcoal and oxides; all of these cathodes have been attempted to be applied to the cathode for use in hydrogen generation in caustic soda.

However, for the purpose of reducing the electrolysis voltage, it is necessary to further reduce the overvoltage, and accordingly electrodes based on various concepts have been proposed.

In JP-B-3-75635 (EP129734B), a layer of a heterogeneous mixture composed of a platinum group oxide and nickel oxide has been formed as a coating layer on a conductive metal base and thus a cathode having a low overvoltage has been made.

In U.S. Pat. No. 4,668,370, composite plating with a noble metal oxide and metallic nickel actualizes a low overvoltage and enhances the durability of the coating layer. In JP-B-6-33481 and JP-B-6-33492 (U.S. Pat. No. 4,900,419 or EP 298,055B), a composite substance composed of platinum and cerium is adopted as an electrode coating material, permitting enhancement of the poisoning resistance against iron.

In U.S. Pat. Nos. 5,645,930 and 5,882,723, ruthenium chloride, palladium chloride and ruthenium oxide are applied onto a conductive base, the base thus processed is calcined in the air, and thereafter subjected to electroless plating with nickel, thus improving the coating strength.

In JP-A-11-140680, an electrode coating layer mainly composed of ruthenium oxide is formed on a metal base, and further a porous and low-active protective layer is formed on the surface thereof, thus improving the electrode durability.

In JP-A-11-158678, an electrode coating layer is formed which is provided with a coating layer of ruthenium oxide, nickel and a rare earth metal capable of absorbing hydrogen formed on a metal base by pyrolysis, and thus electrolytic oxidation is prevented by maintaining the cathode at the hydrogen absorbing potential against the reverse current caused by the termination of the electrolysis.

In JP-A-11-229170, an electrodeposited nickel layer is provided in which ruthenium oxide is dispersed, the surface of the layer is coated with a conductive oxide composed of titanium oxide, and thus the resistance to mercury poisoning is improved.

However, even in the above described examples, the electrode operating life is short so that as matters stand, indeed, further elongation of the electrode operating life is an objective.

In WO01/28714, the interior of the coating layer is made porous and hence the surface area is made larger so that the resistance to the impurities found in alkali is improved, and a cathode having a low overvoltage is formed.

DISCLOSURE OF THE INVENTION

The present invention was achieved for the purpose of overcoming the above described problems and takes as its object the provision of a cathode which is stable in quality, low in overvoltage and excellent in durability by applying a pyrolysis method suitable for mass production.

As a result of an investigation intended to obtain a cathode in line with the above described object for the purpose of overcoming the above described problems, the present inventors came to find the experimental results described below in the course of the investigation.

(a) Ruthenium oxide and the hydrate thereof are effective as the electrode active material for an active cathode.

(b) However, ruthenium oxide is slowly reduced to ruthenium hydrate at the hydrogen generation potential so that a structural change is caused.

(c) When ruthenium chloride is thermally decomposed in a reductive atmosphere of hydrogen or an inert gas, it is reduced into metallic ruthenium; metallic ruthenium is high in overvoltage, and is easily exfoliated from the base, thereby resulting in poor durability.

(d) When the temperature is raised in the pyrolysis, the carbon atoms in oxalic acid exhibit an oxidation effect so that the generation of ruthenium oxide is scarce even for the case where calcination is conducted in an oxidative atmosphere. Additionally, a substance calcined in the presence of oxalic acid is low in overvoltage and tends to maintain a stable structure even at the hydrogen generation potential in contrast to the metallic ruthenium generated by calcination in a reductive atmosphere, and accordingly can maintain a low overvoltage over a long period of time.

(e) Compounds of lanthanum, cerium and yttrium themselves are poor in hydrogen generation activity, but the oxides thereof are converted from particle shapes into needle shapes during electrolysis, and the needle-shape forms play the role of holding the coating layer composed of either ruthenium oxide or ruthenium hydrate, thus being effective in preventing the physical exfoliation of the coating layer.

The present inventors perfected the present invention by discovering a technique which permits the production of a crystal structure stable as a coating layer even by pyrolysis in an oxidative atmosphere with generation of reductive hydrogen, as a result of the investigation described above. Herewith, it has become possible to provide a cathode that is small in the number of constraints for production, low in production cost and can maintain a low overvoltage over a long period of time.

In other words, the present invention is described as follows.

(1) An electrode for use in hydrogen generation comprising a conductive base and a coating layer formed thereon of a composition which is obtainable by pyrolysis, in the presence of an organic acid, of a mixture comprising at least one type of platinum group compound.

(2) An electrode for use in hydrogen generation comprising a conductive base and a coating layer formed thereon of a composition which is obtained by thermally decomposing, in the presence of an organic acid, a mixture comprising at least one type of platinum group compound and at least one type of compound selected from the group consisting of a lanthanum compound, a cerium compound and a yttrium compound.

(3) The electrode for use in hydrogen generation described above in (2), wherein the amount of at least one type of compound selected from the group consisting of a lanthanum compound, a cerium compound and a yttrium compound falls within a range from $1/20$ to $1/2$ mol in relation to one mol of metal component in the above described platinum group compound, and the amount of the above described organic acid falls within a range from $1/20$ to 2 mols in relation to one mol of the metal component in the platinum group compound.

(4) The electrode for use in hydrogen generation described above in any of (1) to (3), wherein the above described platinum group compound is a ruthenium compound and the above described organic acid is oxalic acid.

(5) An electrode for use in hydrogen generation comprising a conductive base and a coating layer formed thereon, wherein the coating layer is a composition obtainable by thermally decomposing, in an oxygen atmosphere, a mixture comprising a ruthenium compound, oxalic acid in a range from $1/20$ to 2 mol and at least one type of compound selected from the group consisting of a lanthanum compound, a cerium compound and a yttrium compound in a range from $1/20$ to $1/2$ mol, in relation to one mol of metal component in the ruthenium compound.

(6) A method of producing an electrode for use in hydrogen generation, comprising the steps of applying onto a conductive base a mixture comprising at least one type of platinum group compound and thermally decomposing the applied mixture in the presence of an organic acid to form a coating layer on the conductive base.

(7) An electrode for use in hydrogen generation obtainable by the method described above in (6).

(8) A method of producing an electrode for use in hydrogen generation, comprising the steps of applying onto a conductive base a mixture comprising at least one type of platinum group compound and at least one type of compound selected from the group consisting of a lanthanum compound, a cerium compound and a yttrium compound, and thermally decomposing the applied mixture in the presence of an organic acid to form a coating layer on the conductive base.

(9) The method of producing an electrode for use in hydrogen generation described above in (8), wherein the amount of at least one type of compound selected from the group consisting of a lanthanum compound, a cerium compound and a yttrium compound falls within a range from $1/20$ to $1/2$ mol in relation to one mol of metal component in the above described platinum group compound and the amount of the organic acid falls within a range from $1/20$ to 2 mol in relation to one mol of the metal component in the platinum group compound.

(10) The method of producing an electrode for use in hydrogen generation described above in any one of (6), (8) and (9), wherein the above described platinum group compound is a ruthenium compound and the organic acid is oxalic acid.

(11) The method of producing an electrode for use in hydrogen generation described above in any one of (6) and (8) to (10), wherein the pyrolysis is conducted in an oxygen atmosphere.

The electrode of the present invention is used as an active cathode in chlor-alkali electrolysis based on the ion exchange method. Additionally, the active cathode of the present invention is suitably used particularly in a zero-gap type chlor-alkali electrolysis vessel based on an ion exchange membrane method, maintains a low overvoltage over a long period of time and is excellent in durability, and can prevent the deterioration of the ion exchange membrane because the elution from the electrode is low at the termination of the electrolysis vessel operation.

BEST MODE FOR CARRYING OUT THE INVENTION

Figure 1:
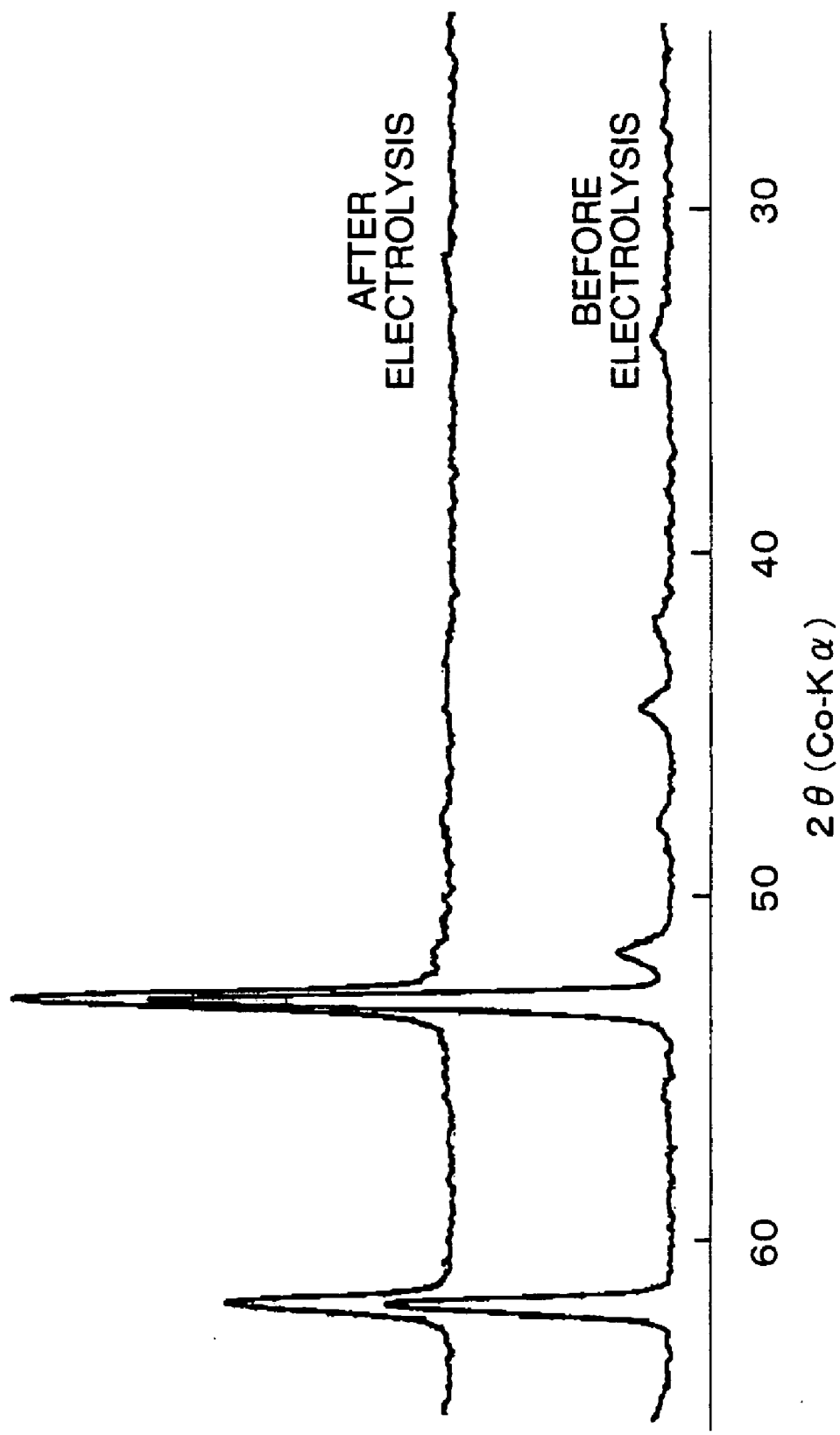
FIG. 1 shows an X-ray diffraction chart obtained before and after electrolysis for the coating layer composed of the pyrolysis products of ruthenium chloride and oxalic acid in Example 1.

Because the conductive base is used in a high concentration alkali aqueous solution, it may be made of a stainless steel, but iron and chromium are eluted from a stainless steel electrode and the conductivity of a stainless steel is of the order of $1/10$ that of nickel so that it is preferable to use nickel.

The base shape is not particularly limited, and an appropriate shape can be chosen according to the purpose in such a way that a porous plate shape, an expanded shape and a woven mesh shape formed by weaving nickel wire are preferably used. As for the base shape, an appropriate shape is dependent on the distance between the anode and cathode; when the distance is finite, either a porous plate shape or an expanded shape is used, while when the membrane and the electrodes contact each other, namely, a zero gap electrolysis vessel is used, a woven mesh made by weaving thin wire or the like is used.

It is preferable that these bases are annealed in an oxidative atmosphere to alleviate the residual stress because the residual stress generated at the time of fabrication still remains. Additionally, for the purpose of forming the coating layer on the base surface in an adhering manner, it is preferable to form irregularities on the base surface by the use of a steel grid or alumina powder and thereafter the surface area is increased by the acid treatment.

The roughness degree of the surface is not particularly specified, but it is desirable that preferably the JIS surface roughness of Ra=1 to 10 µm be employed, because the base is sometimes used in such a manner that it contacts the ion exchange membrane. Accordingly, it is preferable that blasting is conducted by use of an alumina powder of 100 µm or less in average particle size, or an acid treatment is conducted. As the acid, preferably used are the inorganic acids including hydrochloric acid, nitric acid, sulfuric acid and phosphoric acid, among which sulfuric acid is preferably used owing to easier handling. It is preferable that the acid treatment is conducted at a temperature falling within the range from 60 to 90° C. with an aqueous sulfuric acid of 10 to 50 wt % for 1 to 8 hours.

It is preferable that as the pretreatment of the base, an aqueous solution containing 0.001 to 1% of surfactant is applied thereon and dried, and then a coating solution as described below is applied thereon. The pretreatment improves the wettability of the base surface and base surface irregularities so that the coating solution can be applied evenly even in the interior portions of the irregularities; accordingly, at the time of calcination in the air, the electrode active material is formed even in the interior portions of the irregularities in the base surface. This conceivably provides the effect of increasing the surface area and the effect of improving the adhesiveness between the electrode active material, that is, the electrode coating layer and the electrode base.

The surfactant used in the above described pretreatment may be any type of the anionic, cationic and nonionic types, and actually a nonionic surfactant is preferably used. The amount of the surfactant can be small such that a 0.1 to 0.01% aqueous solution is preferably used.

The platinum compound used as the component in the coating solution is selected from the Pt compounds, Ir compounds, Ru compounds, Rh compounds, Pd compounds and Os compounds; the ruthenium compounds are most preferable. The platinum group compound used as the component in the coating solution can be any form of chloride, sulfate and nitrate; the chlorides are preferably used in view of the ease in pyrolysis and the ease in the availability of the raw salts thereof. The metal concentration in a platinum group compound is not particularly limited, but preferably falls within the range from 10 to 200 g/L, more preferably within the range from 50 to 120 g/L, in view of the thickness of the coating layer in one application.

Any forms of the lanthanum compounds, cerium compounds and yttrium compounds can be used, but the metal salts such as nitrates, sulfates and chlorides are preferable, and the chlorides are used more preferably in view of the ease in pyrolysis and the ease in the availability of the raw salts thereof. The substance having the effect of creating the reductive atmosphere at the time of pyrolysis is the one having carbon such as oxalic acid, formic acid, acetic acid, citric acid and the like, among which oxalic acid is preferably used. The two forms of anhydrate and dihydrate exist for oxalic acid, among which the dihydrate is preferably used in view of the ease of availablilty.

An organic acid can be added to a solution of a mixture containing a platinum group compound and at least one type of compound selected from the group consisting of lanthanum compounds, cerium compounds and yttrium compounds, or an organic acid can be placed in the furnace at the time of pyrolysis instead of adding to the solution of the mixture. However, it is desirable that the organic acid is mixed with a platinum group compound and at least one type of compound selected from the group consisting of lanthanum compounds, cerium compounds and yttrium compounds. Other solutions can be added to the solution of the mixture. The mixture may remain partially as precipitates in the solution. Such solutions include water, various alcohols including propyl alcohol, butyl alcohol and allyl alcohol and other solvents, and have only to be those that can dissolve or suspend the mixture. It is most preferable that the solution is either an aqueous solution or a suspension in water.

As for the mixture containing an organic acid, a platinum group compound and at least one type of compound selected from the group consisting of lanthanum compounds, cerium compounds and yttrium compounds, it is preferable that the amount of the organic acid falls within the range from $1/20$ to 2 mol and the amount of cerium falls within the range from $1/20$ to $1/2$ mol in relation to one mol of the metal component in the platinum group compound, in order for the components of the mixture to be thermally decomposed and for the coating layer to display a sufficient effect.

When the amount of the organic acid is smaller that $1/20$ mol in relation to one mol of the metal component in the platinum group compound, the reduction prevention effect of the organic acid is not sufficient in the coating layer, while when the amount is larger than 2 mols, precipitates and the like are generated in preparation of the coating solution. Preferably, the amount of the organic acid falls within the range from $1/10$ to 1 mol and the amount of cerium falls within the range from $1/8$ to $1/4$ mol in relation to one mol of ruthenium.

As the method for applying onto the conductive base the mixture containing an organic acid, a platinum group compound and at least one type of compound selected from the group consisting of lanthanum compounds, cerium compounds and yttrium compounds, preferably used are a dip method in which the base is dipped into the coating solution, a brushing method in which the base is brushed with a coating solution, a roller method in which the coating is made with a sponge-like roller impregnated with the coating solution, and an electrostatic coating method in which the coating solution is sprayed in such a way that the coating solution and the base are charged with opposite charges.

Among these methods, the roller method and the electrostatic method are preferably used because these two methods are high in productivity and permit an even application of the coating solution.

The coating solution is applied onto the base, then the base is dried at a temperature of the order of 10 to 50° C., and the pyrolysis is conducted with the base placed in a muffle furnace heated to 300 to 650° C. The pyrolysis means a reaction in which the mixture containing precursors is heated for the purpose of accelerating the decomposition; here the pyrolysis means a reaction in which the metal salt is decomposed into the metal and gaseous substances. Specifically, the pyrolysis means the following reactions: if the metal salt is a chloride, the salt is decomposed into the metal and chlorine gas; if the metal salt is a compound derived from nitric acid, the salt is decomposed into the metal, and nitrogen and NOx gases; and if the metal salt is a compound derived from sulfuric acid, the salt is decomposed into the metal, sulfur, and SOx gases. On one hand, as for the metals, the reactions involved depend on the reaction atmosphere, and many metals tend to be bonded to oxygen and thereby to form oxides in the oxygen atmosphere. The oxygen atmosphere means an atmosphere in which oxygen is contained, and the most preferable oxygen atmosphere is the air in view of the production cost.

In order to accelerate the pyrolysis of the mixture containing an organic acid, at least one type of platinum group compound and at least one type of compound selected from the group consisting of lanthanum compounds, cerium compounds and yttrium compounds, it is preferable that the pyrolysis temperature falls within the range from 450 to 600° C. At temperatures lower than 450° C., the pyrolysis rate of the mixture is slow, while at temperatures higher than 600° C., the softening of the nickel base is sharply promoted. Accordingly, in view of the acceleration of the mixture pyrolysis and the maintenance of the nickel base strength, the temperature range from 500 to 550° C. is most preferable. It is preferable that the time duration of the pyrolysis is long for the purpose of thermally decomposing to a full extent, but in view of the prevention of the thermally decomposed products from being fully oxidized and the productivity of the electrode, the pyrolysis time duration for one run of pyrolysis preferably falls within the range from 5 to 60 minutes, more preferably from 10 to 30 minutes.

The pyrolysis forms the coating layer on the conductive base. The prescribed thickness of the coating layer is obtained by repeating according to need the cycle of application, drying and pyrolysis calcination. The thicker is the coating layer, the longer is the period over which a low overvoltage can be maintained; however, it is preferable that the thickness of the coating layer is 1 to 5 µm from the viewpoint of economic efficiency. The coating weight is preferably 6 g to 30 g per an apparent surface area of 1 m$^2$, more preferably 2 to 3 µm, that is, 12 to 18 g per an apparent area of 1 m$^2$ as the coating amount.

For the purpose of attaining a prescribed thickness, the coating amount in one application may be increased or the metal concentration of the platinum group compound may be increased; however, with a large coating amount, coating unevenness may possibly occur at the time of application and thus a nonuniform coating layer may be formed, and hence it is preferable that several cycles of application-drying-pyrolysis calcination are conducted. The coating layer thickness attained in one cycle is preferably regulated to be of the order of 0.1 to 0.7 µm, more preferably to be 0.2 to 0.4 µm.

It is preferable that calcination is conducted for a long time duration for the purpose of stabilizing the coating layer, after the coating layer of a prescribed thickness has been formed so that the pyrolysis of the coating layer may be fully conducted. The calcination conditions specify the temperature range to be from 500 to 650° C., preferably from 500 to 550° C. With a short time duration of the coating layer pyrolysis, the pyrolysis of the coating layer does not proceed to a full extent, while with too long a time duration, the reduction effect of the organic acid fades away and accordingly the oxidation of the coating layer proceeds unpreferably. Thus, a reasonable time duration for pyrolysis is of the order of 30 minutes to 8 hours, and preferably falls in the range from one hour to 3 hours.

As a coating layer, on a conductive base is provided a composition which is obtained by thermally decomposing in the presence of an organic acid the mixture containing at least one type of platinum group compound (preferably a ruthenium compound) and at least one type of compound selected from the group consisting of lanthanum compounds, cerium compounds and yttrium compounds.

The effect of an organic acid (preferably oxalic acid) is to improve the durability through small structural changes of the structure even when the organic acid is used in a hydrogen reduction atmosphere because the generation of such oxides that are high in crystallinity and easily reduced in a hydrogen reduction atmosphere so as to tend to cause structural changes in scarce. X-ray diffraction measurement changes observed before and after electrolysis in the coating layer itself are small. Even in the calcination in an atmosphere containing a large amount of oxygen, the generation of oxides that are easily reduced in the hydrogen atmosphere formed in the actual operation of electrolysis is scarce. Consequently, it is conceivable that on the conductive base is formed a composition that is evidently different from a composition obtained by pyrolysis in the absence of an organic acid.

The substance (preferably a cerium compound) selected from the group consisting of lanthanum compounds, cerium compounds and yttrium compounds itself is low in hydrogen generation activity, but the oxide derived from that substance is converted from particle shapes to needle shapes in the environment where hydrogen is generated, and the needle shaped form plays the role of maintaining the coating layer made of a platinum group compound and has an effect of suppressing the physical exfoliation of the coating layer.

The coating layer is structurally stable even in the reductive atmosphere where hydrogen is generated because the layer has the effect of suppressing the generation of the platinum group oxides and the effect of converting the forms of such poorly active compounds as lanthanum oxide, cerium oxide and yttrium oxide during electrolysis; thus, the physical exfoliation of the coating layer can be suppressed, and the low overvoltage can be maintained over a long period of time. The involvement of an organic acid at the time of pyrolysis makes it possible to conduct calcination in the air which is useful from an industrial viewpoint.

<Determination of Ruthenium Oxide in the Coating Layer>

In the case where ruthenium oxide is selected as a platinum group compound, the quantity of the ruthenium oxide in the coating layer is determined as follows.

A sample in which a coating layer is formed on a nickel base is placed in the sample holder of an X-ray diffraction measurement apparatus, and measurement is conducted with a Co X-ray tube or a Cu X-ray tube. Then, the intensities of the most intense peaks of ruthenium oxide and nickel are compared. Specifically, a peak area is obtained from the peak height multiplied by the half maximum full width, and the intensities thus obtained are compared. Here, the half maximum full width means the diffraction line width at the 50% height of the peak intensity. With a Co X-ray tube, the most intense line of nickel is found around $2\theta=52°$ and the most intense line of ruthenium oxide is found around $2\theta=32.6°$, where $\theta$ denotes the diffraction angle.

The intensity ratio between ruthenium oxide and the nickel of the base is preferably 5/100 or less, more preferably 1/100 or less. When the intensity ratio between ruthenium oxide and the nickel of the base is larger than 5/100, the content of ruthenium oxide becomes large, and accordingly the structural change is caused by the reduction of ruthenium oxide occurring in the reductive atmosphere where hydrogen is generated strongly, leading to exfoliation of the coating layer. The reason for the exfoliation of the coating layer is not clear, but may be ascribable to the structural change probably inducing crystal structure change and generating strains in the crystal. Actually, in a cathode which has a large content of ruthenium oxide, the exfoliation of the coating layer is confirmed when observation is made with an electron microscope after energization.

<Measurement of the Electrode Overvoltage>

The overvoltage of the cathode, with the coating layer formed thereon, for use in hydrogen generation is measured by the following method.

A piece of cathode of 48×58 mm in size is cut out, and two holes are bored in the piece for the purpose of fixing the piece in a small cell with nickel screws. An electrode formed by applying a coating onto an expanded base can be subjected to evaluation as it is; a piece of woven mesh made of thin wire is fixed onto an expanded base having no coating film thereon by use of thin nickel wire or the like and then subjected to measurement. A reference electrode can be a string of PFA (tetrafluoroethylene-perfluoroalkyl vinyl ether copolymer) coated platinum wire with about 1 mm long of exposed platinum portion, fixed onto an electrode surface facing the ion exchange membrane.

The anode used is a so-called DSA composed of ruthenium oxide, iridium oxide and titanium oxide formed on a titanium base, and EPDM (ethylene propylene diene) rubber gaskets are used as the anode cell and the cathode cell between which a sheet of ion exchange membrane is sandwiched to conduct electrolysis. The type of the ion exchange membrane is not particularly limited; however, it is preferable to conduct electrolysis by use of a cation exchange membrane "Aciplex®" for use in sodium chloride electrolysis manufactured by Asahi Kasei Corp.

In the electrolysis, a current pulse generator is used as the rectifier for electrolysis, the current is made to flow with a prescribed current density, the current is instantaneously turned off when the resulting wave form is observed on an analyzing recorder or the like, and thus the overvoltage is derived by subtracting the solution resistance between the electrode concerned and the reference electrode.

The electrolysis conditions are as follows: the current density: 3 kA/m$^2$ or 4 kA/m$^2$; the brine concentration in the anode chamber: 205 g/L; the alkali concentration in the cathode chamber: 32 wt %; and the electrolysis temperature: 90° C. For the purpose of confirming the long-term stability of the electrolysis, the cathode overvoltage measurement is performed after 30 days have elapsed from the start of the electrolysis. The weight change of the coating layer is derived as follows: the screws fixing the electrode are loosened to unfix the electrode after the electrolysis has been terminated, the unfixed electrode is fully washed with water and dried, and the weight thereof is measured; thus the weights before and after electrolysis are compared.

Description will be made below with reference to Examples, but the present invention is not limited to the Examples.

EXAMPLE 1

An electrode-shaped nickel expanded base, in which the short way of aperture dimension SW was 3 mm, the long way of aperture dimension LW was 4.5 mm, the feed pitch for expansion processing was 0.7 mm, and the plate thickness was 0.7 mm, was calcined at 400° C. for 3 hours in the air and an oxide coating layer was thereby formed on the surface thereof. Subsequently, blasting with an alumina powder of 100 µm or less in weight average particle size was conducted to provide the base surface with irregularities. Then, the base was subjected to acid treatment in 25 wt % sulfuric acid at 90° C. for 4 hours, and the base surface was provided with finer irregularities.

In the next place, the nickel base was soaked into a solution in which a surfactant "Nonion N210" (trade mark: a nonionic surfactant manufactured by NOF Corp. (Nippon Yushi K.K.)) was dissolved in water in the ratio of 0.15 g of the surfactant to 200 g of water, and then the base was taken out and dried in the air.

Then, oxalic acid dihydrate was added to a ruthenium chloride solution in 6% hydrochloric acid with a metal concentration of 100 g/L in such a way that the molar amount of oxalic acid dihydrate was 0.5 times the molar amount of ruthenium, and the mixture thus obtained was stirred at 90° C. for one day to yield a mixture composed of ruthenium chloride and oxalic acid.

Subsequently, the nickel base was soaked into the mixture, and then dried at 50° C. for 10 minutes and calcined at 500° C. for 10 minutes in the air. Then, a combined process of the soaking into the solution containing oxalic acid and ruthenium, drying and calcination at 500° C. was repeated 5 times in total, and then the base was calcined at 550° C. for one hour.

The cathode as it was in this condition was cut into a piece of 48×58 mm, the piece was fixed in a small cell and subjected to the overvoltage evaluation. The cathode piece cut into the size of 48×58 mm, for the purpose of making the piece removable, was fixed to the rib of the nickel cell body with nickel screws. As the reference electrode, a PFA coated platinum wire, fixed longitudinally, with an about 1 mm long exposed platinum portion was used. The anode used was a so-called DSA composed of ruthenium oxide, iridium oxide and titanium oxide formed on a titanium base, the anode cell and the cathode cell used were EPDM (ethylene propylene diene) rubber gaskets, and the ion exchange membrane used was "Aciplex®" F4203 manufactured by Asahi Kasei Corp.

In the electrolysis, a current pulse generator "HC114™" manufactured by Hokuto Denko Co., Ltd. was used as the rectifier for electrolysis. The electrolysis conditions were as follows: the current density: 4 kA/m$^2$; the brine concentration in the anode chamber: 205 g/L; the alkali concentration in the cathode chamber: 32 wt %; and the electrolysis temperature: 90° C. The cathode overvoltages after 3 days and 30 days elapsed from the start of the electrolysis were measured. The cathode overvoltages were derived as follows.

The cathode voltage E1 against the platinum wire at the current density of 4 kA/m$^2$ was measured, and then the voltage E2 was measured at the time when the current was instantaneously turned off by means of the current pulse generator "HC114™" manufactured by Hokuto Denko Co., Ltd. E2 corresponded to the measured voltage associated with the structural resistance and solution resistance. Thus, the net overvoltage was derived as E1–E2.

The weight change was derived as follows: the screws fixing the electrode were loosened to unfix the electrode after the electrolysis had been terminated, the unfixed electrode was fully washed with water and dried, and the weight thereof was measured; thus the weights before and after electrolysis were compared.

Thus, after 3 days, the overvoltage was found to be 74 mV and the weight change was found to be 0 mg. The same cathode was successively subjected to the electrode evaluation and it was found that the overvoltage was 73 mV and the weight change was 1 mg even after 30 days, manifesting that a cathode that was low in overvoltage and excellent in durability was obtained.

Additionally, the X-ray diffraction pattern of the cathode specimen was measured by use of a Rigaku-Denki Geiger flex 4036A2 X-ray diffractometer with a Co X-ray tube. The results obtained are shown in FIG. 1.

Before energization, the most intense peak of the nickel base was found around 52°, and no peaks of ruthenium oxide were found around 32°, 42° and 65°. After energization, changes were scarcely found except for the advent of the peaks due to nickel oxide around 44° and 51°, and no exfoliation of the coating layer was found in the electron micrograph taken after energization.

EXAMPLES 2 TO 6

An electrode-shaped nickel expanded base, in which the short way of aperture dimension SW was 3 mm, the long way of aperture dimension LW was 4.5 mm, the feed pitch for expansion processing was 0.7 mm, and the plate thickness was 0.7 mm, was calcined in the air at 400° C. for 3 hours and an oxide coating layer was thereby formed on the surface thereof. Subsequently, blasting with an alumina powder of 100 μm or less in weight average particle size was conducted to provide the base surface with irregularities. Then, the base was subjected to acid treatment in 25 wt % sulfuric acid at 90° C. for 4 hours, and the base surface was provided with finer irregularities.

In the next place, the nickel base was soaked into a solution in which a surfactant "Nonion N210" (trade mark: a nonionic surfactant manufactured by NOF Corp. (Nippon Yushi K.K.)) was dissolved in water in the ratio of 0.15 g of the surfactant to 200 g of water, and then the base was taken out and dried in the air.

Then, oxalic acid dihydrate was added to a ruthenium chloride mixture having a metal concentration of 100 g/L in such a way that the molar ratio of oxalic acid dihydrate took the values specified in Table 1 in relation to one mol of ruthenium, then additionally cerium chloride was added in such a way that the molar ratio of cerium took the values specified in Table 1 in relation to one mol of ruthenium, and the mixture thus obtained was stirred at 90° C. for one day to yield a mixture composed of ruthenium chloride, cerium chloride and oxalic acid.

Subsequently, the nickel base was soaked into the mixture, and then dried at 50° C. for 10 minutes and calcined at 500° C. for 10 minutes in the air. Then, a combined process of the soaking into the mixture, drying and calcination at 500° C. was repeated 10 times in total, and finally the base was calcined at 550° C. for one hour. The thickness of the coating layer after calcination was 2 to 3 μm.

The cathode as it was in this condition was cut into a piece of 48×58 mm, the piece was fixed in a small cell and subjected to the overvoltage evaluation. The cathode piece cut into the size of 48×58 mm, for the purpose of making the piece removable, was fixed to the rib of the nickel cell body with nickel screws. As the reference electrode, a PFA coated platinum wire, fixed longitudinally on a surface contacting the ion exchange membrane, with an about 1 mm long exposed platinum portion was used. The anode used was a so-called DSA composed of ruthenium oxide, iridium oxide and titanium oxide formed on a titanium base, the anode cell and the cathode cell used were EPDM (ethylene propylene diene) rubber gaskets, and the ion exchange membrane used was "Aciplex®" F4203 manufactured by Asahi Kasei Corp.

In the electrolysis, the current pulse generator "HC114™" manufactured by Hokuto Denko Co., Ltd. was used as the rectifier for electrolysis. The electrolysis conditions were as follows: the current density: 3 kA/m$^2$; the brine concentration in the anode chamber: 205 g/L; the alkali concentration in the cathode chamber: 32 wt %; and the electrolysis temperature: 90° C. The cathode overvoltages after 30 days had elapsed from the start of the electrolysis were measured.

The cathode overvoltages were derived as follows. The cathode voltage E1 against the reference electrode at the current density of 3 kA m$^2$ was measured, and then the voltage E2 was measured at the time when the current was instantaneously turned off by means of the current pulse generator HC114. E2 corresponded to the voltage associated with the structural resistance and solution resistance. Thus, the net overvoltage was derived as E1–E2.

The weight change of the coating layer was derived as follows: the screws fixing the electrode were loosened to unfix the electrode after the electrolysis had been terminated, the unfixed electrode was fully washed with water and dried, and the weight thereof was measured; thus, the weight changes were derived from the weights before electrolysis and after 30 days of energization. The results obtained are shown in Table 1.

TABLE 1

|  | Example | | | | |
|---|---|---|---|---|---|
|  | 2 | 3 | 4 | 5 | 6 |
| Oxalic acid mol | 1 | 1/2 | 1/4 | 1/2 | 1/10 |
| Ce amount mol | 1/4 | 1/4 | 1/4 | 1/8 | 1/4 |
| Overvoltage mV | 72 | 69 | 73 | 74 | 71 |
| Coating weight reduction mg | 3 | 2 | 3 | 4 | 2 |

In the present Examples, as Table 1 shows, the overvoltages were low and the weight reductions of the electrode coating layers were small, that is, electrodes high in durability were obtained.

Figure 2:
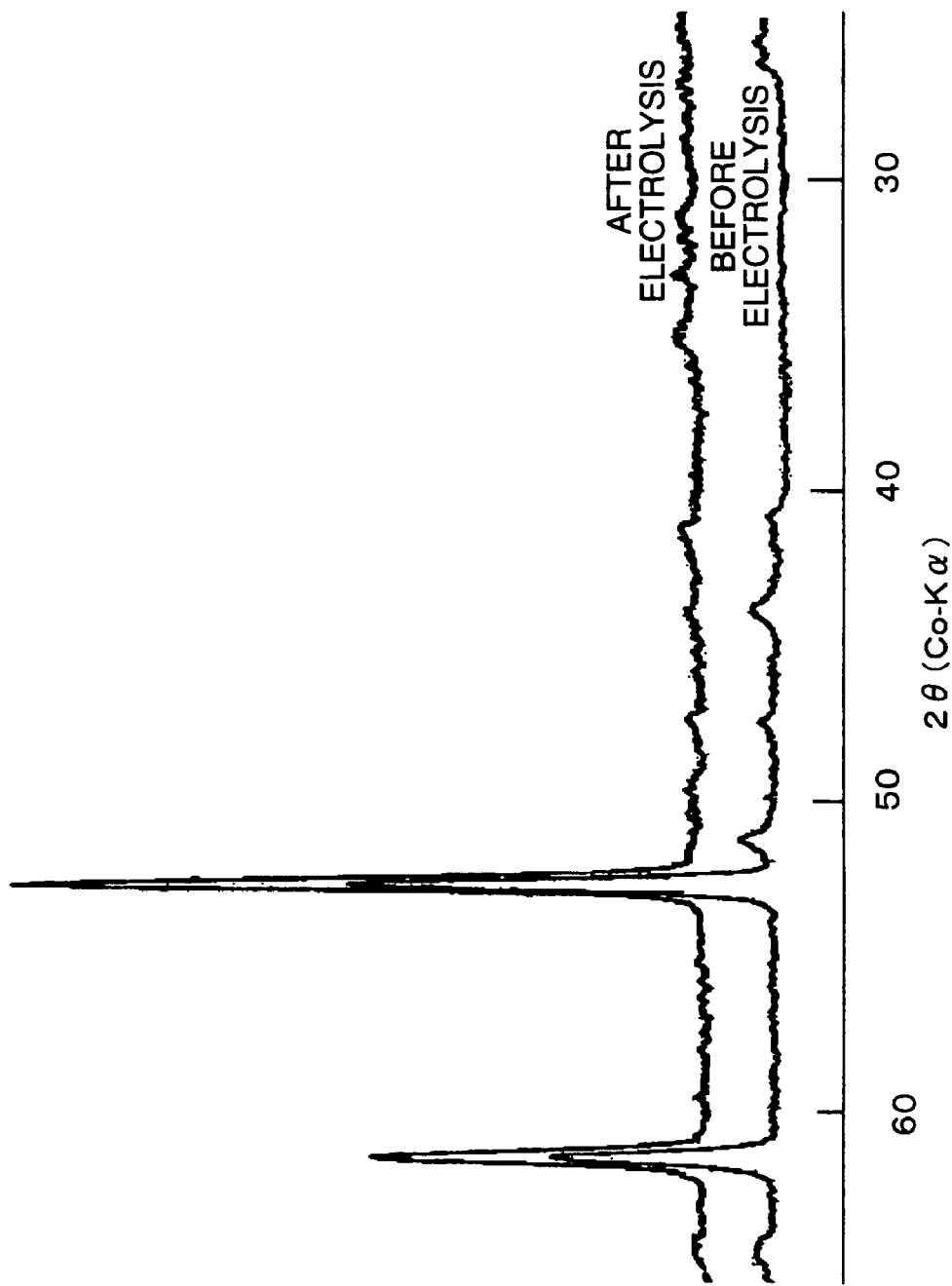
FIG. 2 shows an X-ray diffraction chart obtained before and after electrolysis for the coating layer composed of the pyrolysis product of $RuCl_3+CeCl_3+$oxalic acid in Example 3.

The X-ray diffraction pattern of the cathode sample produced by using the mixture of ruthenium 1 mol-oxalic acid ½ mol-Ce ¼ mol in Example 2 was measured by means of a Rigaku-Denki Geiger flex 4036A2 X-ray diffractometer with a Co X-ray tube. The results obtained are shown in FIG. 2.

Before energization, the most intense peak of the nickel base was found around 52°, and no peak of ruthenium oxide was found around 32°. After energization, changes were scarcely found except for the advent of the peaks due to nickel oxide around 44° and 51°, and no exfoliation of the coating layer was found in the electron micrograph taken after energization.

Figure 3:
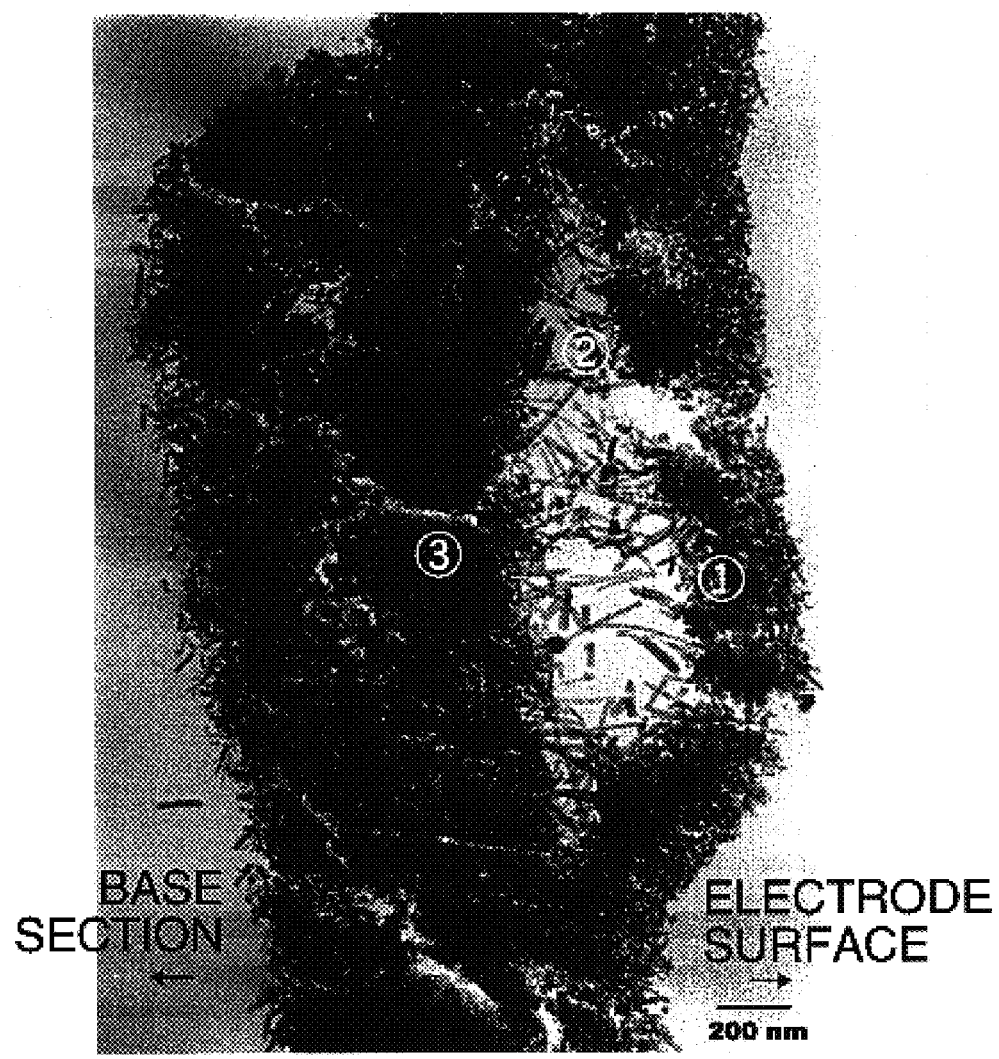
FIG. 3 shows a transmission electron micrograph of a section of the cathode coating layer of Example 3 after energization.

The cathode coating layer of a sample after 30 days of energization was peeled off from the expanded nickel base, and the sectional shape of the sample was subjected to conditioning and then to observation on a transmission electron microscope. The electron micrograph taken is shown in FIG. 3. The results of observation confirmed the effect that cerium was converted into needle-shaped forms in the portions ① and ② in FIG. 3, and such needle-shaped particles play a role of holding the coating layer ③ composed of ruthenium oxide and ruthenium hydrate so that the exfoliation of the coating layer was suppressed.

The void found between ① and ③ in FIG. 3 was formed when the sample for the transmission electron microscope observation was prepared, permitting a clear observation of the condition of the needle-shaped particles.

EXAMPLE 7

A woven mesh base made of a thin nickel wire of 0.15 mm in diameter with a mesh 50 aperture was calcined at 400° C. for 3 hours in the air to form an oxide coating layer on the surface thereof. Subsequently, blasting with an alumina powder of 100 μm or less in weight average particle size was conducted to provide the base surface with irregularities. Then, the base was subjected to acid treatment in 25 wt % sulfuric acid at 90° C. for 4 hours, and the base surface was provided with finer irregularities.

In the next place, the nickel base was soaked into a solution in which a surfactant "Nonion N210" (trade mark: a nonionic surfactant manufactured by NOF Corp. (Nippon Yoshi K.K.)) was dissolved in water in the ratio of 0.15 g of the surfactant to 200 g of water, and then the base was taken out and dried in the air.

Then, oxalic acid dihydrate was added to a ruthenium chloride solution in hydrochloric acid with a metal concentration of 100 g/L in such a way that the amount of oxalic acid dihydrate was 0.5 mol in relation to one mole of ruthenium, then further cerium chloride was added to the solution in such a way that the amount of cerium was 0.5 mol in relation to one mol of ruthenium, and the mixture thus obtained was stirred at 90° C. for one day to yield a mixture composed of ruthenium chloride, cerium chloride and oxalic acid.

Application of a coating solution onto the woven mesh was conducted by use of an application roller unit in which a vat containing the coating solution was arranged at the undermost position in the unit, an application roller made of EPDM was impregnated with the coating solution, another roller was arranged above the EPDM roller so as to always contact the EPDM roller, and further a roller made of PVC was arranged above the roller positioned above the EPDM roller.

The base onto which the coating solution was applied was made to pass between a pair of sponge rollers made of EPDM, quickly before the base was dried, and the coating solution pooling in the intersection points of the woven mesh was taken up and removed. Then, the woven mesh base was dried at 50° C. for 10 minutes, calcined in the air at 500° C. for 10 minutes, a combination of roller application, drying and calcination at 500° C. was repeated 10 times in total, and then calcination was conducted at 550° C. for one hour.

The cathode as it was in this condition was cut into a piece of 48×58 mm, the piece was fixed in a small cell and subjected to the overvoltage evaluation. The cathode piece cut into the size of 48×58 mm, for the purpose of making the piece removable, was fixed onto an expanded base having no coating film thereon by use of thin nickel wire or the like and then the base was fixed to the rib of the nickel cell body with nickel screws. As a reference electrode, a PFA coated platinum wire, fixed longitudinally on a surface contacting the ion exchange membrane, with an about 1 mm long exposed platinum portion was used. The anode used was a so-called DSA composed of ruthenium oxide, iridium oxide and titanium oxide formed on a titanium base, the anode cell and the cathode cell used were EPDM (ethylene propylene diene) rubber gaskets, and the ion exchange membrane used was "Aciplex®" F4203 manufactured by Asahi Kasei Corp.

In the electrolysis, the current pulse generator "HC114™" manufactured by Hokuto Denko Co., Ltd. was used as the rectifier for electrolysis. The electrolysis conditions were as follows: the current density: 3 kA/m²; the brine concentration in the anode chamber: 205 g/L; the alkali concentration in the cathode chamber: 32 wt %; and the electrolysis temperature: 90° C. The cathode overvoltages after 30 days elapsed from the start of the electrolysis were measured.

The cathode overvoltages were derived as follows. The cathode voltage E1 against the reference electrode at the current density of 3 kA/m² was measured, and then the voltage E2 was measured at the time when the current was instantaneously turned off by means of the current pulse generator HC114. E2 corresponded to the voltage associated with the structural resistance and solution resistance. Thus, the net overvoltage was derived as E1–E2.

The weight reduction of the coating layer was derived as follows: the screws fixing the electrode were loosened to unfix the electrode after the electrolysis had been terminated, the unfixed electrode was fully washed with water and dried, and the weight thereof was measured; thus, the weight reduction was derived from the weights before electrolysis and after 30 days of energization.

After 30 days from the start of the electrolysis, the overvoltage was 68 mV, the coating weight reduction was 2 mg, and thus a cathode low in overvoltage and high in durability was obtained.

COMPARATIVE EXAMPLE 1

A cathode was produced on the basis of the same operations as those in Example 1, except that a ruthenium chloride solution in 6% hydrochloric acid with a metal concentration of 100 g/L was used.

In other words, an electrode-shaped nickel expanded base, in which the short way of aperture dimension SW was 3 mm, the long way of aperture dimension LW was 4.5 mm, the feed pitch for expansion processing was 0.7 mm, and the plate thickness was 0.7 mm, was calcined at 400° C. for 3 hours in the air and an oxide coating layer was thereby formed on the surface thereof. Subsequently, blasting with an alumina powder of 100 μm or less in weight average particle size was conducted to provide the base surface with irregularities. Then, the base was subjected to acid treatment in 25 wt % sulfuric acid at 90° C. for 4 hours, and the base surface was provided with finer irregularities.

In the next place, the nickel base was soaked into a solution in which a surfactant "Nonion N210" (trade mark: a nonionic surfactant manufactured by NOF Corp. (Nippon Yushi K.K.)) was dissolved in water in the ratio of 0.15 g of the surfactant to 200 g of water, and then the base was taken out and dried in the air.

In the next place, the nickel base was soaked into the ruthenium chloride solution in 6% hydrochloric acid with a metal concentration of 100 g/L, dried at 50° C. for 10 minutes, and then calcined at 500° C. for 10 minutes in the air. Subsequently, a combination of the soaking into the ruthenium chloride solution, drying and calcination at 500° C. was repeated 5 times in total, and then calcination was conducted at 550° C. for one hour.

The cathode as it was in this condition was cut into a piece of 48×58 mm, the piece was fixed in a small cell and subjected to the overvoltage evaluation. The cathode piece cut into the size of 48×58 mm, for the purpose of making the piece removable, was fixed to the rib of the nickel cell body with nickel screws.

As the reference electrode, a PFA coated platinum wire, fixed longitudinally, with an about 1 mm long exposed platinum portion was used. The anode used was a so-called DSA composed of ruthenium oxide, iridium oxide and titanium oxide formed on a titanium base, the anode cell and the cathode cell used were EPDM (ethylene propylene diene) rubber gaskets, and the ion exchange membrane used was "Aciplex®" F4203 manufactured by Asahi Kasei Corp.

In the electrolysis, the current pulse generator "HC114™" manufactured by Hokuto Denko Co., Ltd. was used as the rectifier for electrolysis. The electrolysis conditions were as follows: the current density: 4 kA/m$^2$; the brine concentration in the anode chamber: 205 g/L; the alkali concentration in the cathode chamber: 32 wt %; and the electrolysis temperature: 90° C. The cathode overvoltage after 3 days elapsed from the start of the electrolysis was measured.

The cathode overvoltage was derived as follows.

The cathode voltage E1 against the platinum wire at the current density of 4 kA/m$^2$ was measured. The voltage E1 involves the cathode overvoltage, the solution resistance between the reference electrode and the cathode, the nickel cell structure resistance and the contact resistance between the electrode and the rib. Then, the voltage E2 was measured at the time when the current was instantaneously turned off by means of the current pulse generator "HC114". When the current is instantaneously turned off, the cathode overvoltage is instantaneously lowered, and the voltage E2 becomes the voltage associated with the above described solution resistance, structural resistance and contact resistance, and thus the net overvoltage was derived as E1–E2.

The weight change before and after electrolysis was derived as follows: the screws fixing the electrode were loosened to unfix the electrode after the electrolysis had been terminated, the unfixed electrode was fully washed with water and dried, and the weight thereof was measured; thus the weights before and after electrolysis were compared.

From these results, the overvoltage was found to be 75 mV and the weight was found to be reduced by 20 mg. The same cathode was successively subjected to the electrolysis evaluation, and after 30 days, the overvoltage was found to be 82 mV and the additional weight reduction was found to be 22 mg.

Figure 4:
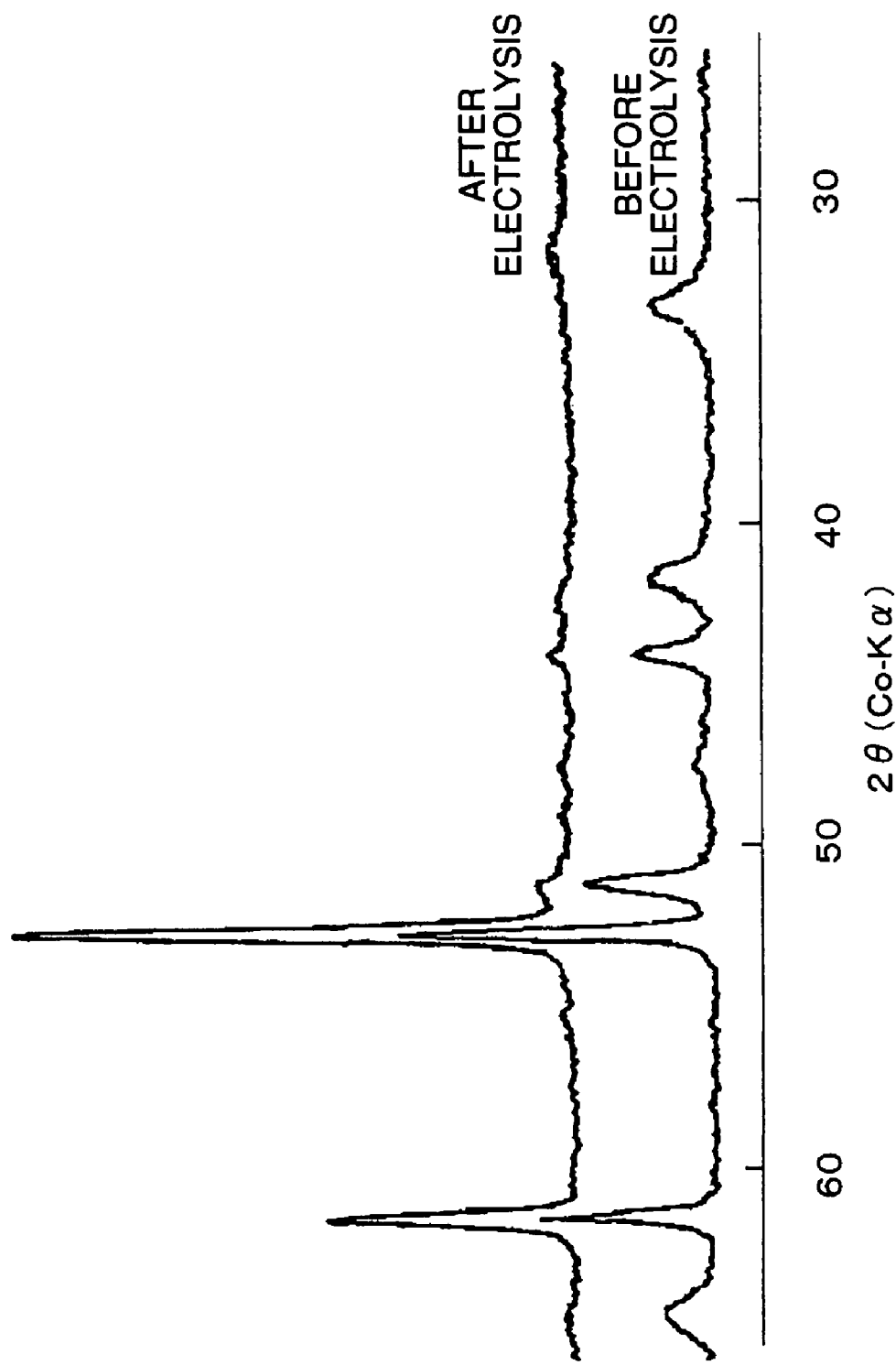
FIG. 4 shows an X-ray diffraction chart obtained before and after electrolysis for the coating layer composed of the pyrolysis product of $RuCl_3$ in Comparative Example 1.

The X-ray diffraction chart obtained with a Co X-ray tube is shown in FIG. 4. Before energization, the most intense peak of the nickel base was found around 52°, a peak of ruthenium oxide was found around 32°, and other peaks of ruthenium oxide were found around 42° and 65°; the calculated peak intensity ratio was 50/100, showing that the content of ruthenium oxide is larger. After energization, the peaks other than those of the nickel base around 61° and 52° practically disappeared.

The observation of the sample after energization with an electron microscope led to the confirmation of the phenomenon that the electrode coating layer was physically exfoliated from the base surface. The exfoliation from the electrode surface probably led to the reduction of the coating layer weight.

COMPARATIVE EXAMPLE 2

A cathode was produced on the basis of the same operations as those in Examples 2–7, except that a ruthenium chloride aqueous solution with a concentration of 100 g/L and an aqueous solution of cerium chloride were used.

In other words, a nickel base, in which the short way of aperture dimension SW was 3 mm, the long way of aperture dimension LW was 4.5 mm, the feed pitch for expansion processing was 0.7 mm, and the plate thickness was 0.7 mm, was calcined at 400° C. for 3 hours in the air and an oxide coating layer was thereby formed on the surface thereof. Subsequently, blasting with an alumina powder of 100 μm or less in weight average particle size was conducted to provide the base surface with irregularities. Then, the base was subjected to an acid treatment in 25 wt % sulfuric acid at 90° C. for 4 hours, and thus the base surface was provided with finer irregularities.

In the next place, the nickel base was soaked into a solution in which a surfactant "Nonion N210" (trade mark: a nonionic surfactant manufactured by NOF Corp. (Nippon Yushi K.K.)) was dissolved in water in the ratio of 0.15 g of the surfactant to 200 g of water, and then the base was taken out and dried in the air.

Then, cerium chloride was added to an aqueous solution of ruthenium chloride with a metal concentration of 100 g/L in such a way that the content of cerium was ¼ mol in relation to one mole of ruthenium, the mixture thus obtained was stirred at 90° C. for one day, and thus a mixture containing ruthenium chloride and cerium chloride was prepared. Then, the nickel base was soaked into the mixture solution, and then dried at 50° C. for 10 minutes and calcined at 500° C. for 10 minutes in the air. Then, a combination of the soaking into the mixture, drying and calcination at 500° C. was repeated 10 times in total, and finally the base was calcined at 550° C. for one hour.

The cathode as it was in this condition was cut into a piece of 48×58 mm, the piece was fixed in a small cell and subjected to the overvoltage evaluation. The cathode piece, cut into a piece of 48×58 mm for the purpose of making the piece removable, was fixed to the rib of the nickel cell body with nickel screws.

As the reference electrode, a PFA coated platinum wire, fixed longitudinally on a surface contacting the ion exchange membrane, with an about 1 mm long exposed platinum portion was used. The anode used was a so-called DSA composed of ruthenium oxide, iridium oxide and titanium oxide formed on a titanium base, the anode cell and the cathode cell used were EPDM (ethylene propylene diene) rubber gaskets, and the ion exchange membrane used was "Aciplex®" F4203 manufactured by Asahi Kasei Corp.

In the electrolysis, the current pulse generator HC114 manufactured by Hokuto Denko Co., Ltd. was used as the rectifier for electrolysis. The electrolysis conditions were as follows: the current density: 3 kA/m$^2$; the brine concentration in the anode chamber: 205 g/L; the alkali concentration in the cathode chamber: 32 wt %; and the electrolysis temperature: 90° C. The cathode overvoltage after 30 days had elapsed from the start of the electrolysis was measured.

The cathode overvoltage was measured as follows. The cathode voltage E1 against the reference electrode at the current density of 3 kA/m$^2$ was measured, and then the voltage E2 was measured at the time when the current was instantaneously turned off by means of the current pulse generator "HC114™". E2 corresponded to the voltage associated with the structural resistance and solution resistance, and hence the net overvoltage was derived as E1–E2.

The weight reduction of the coating layer was derived as follows: the screws fixing the electrode were loosened to unfix the electrode after the electrolysis had been terminated, the unfixed electrode was fully washed with water and dried, and the weight thereof was measured; thus, the weight reduction was derived from the weights before electrolysis and after 30 days from the start of energization. After 30 days from the start of energization, the overvoltage was found to be 91 mV and the weight was found to be reduced by 20 mg.

Figure 5:
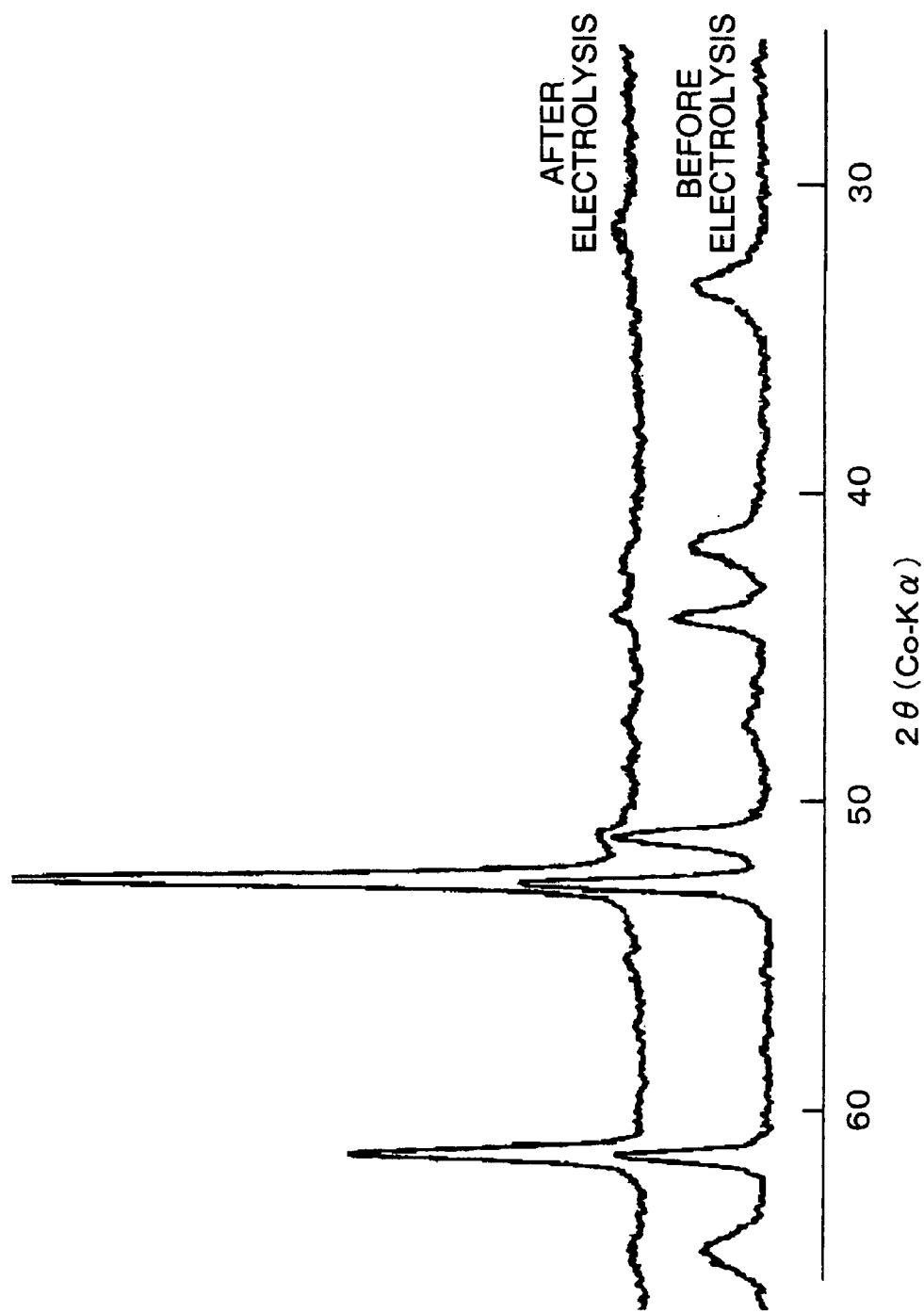
FIG. 5 shows an X-ray diffraction chart obtained before and after electrolysis for the coating layer composed of the pyrolysis product of $RuCl_3+CeCl_3$ in Comparative Example 2.

FIG. 5 shows the X-ray diffraction chart for Comparative Example 2 obtained by use of a Co X-ray tube before and after energization.

According to the X-ray diffraction chart, before energization, the most intense peak of the nickel base was found around 52°, a peak of ruthenium oxide was found around 32°, and other peaks of ruthenium oxide were found around 42° and 65°; the calculated peak intensity ratio was of the order of 95/100, showing that the content of ruthenium oxide was large; it can be seen that after energization, the peaks other than those of the nickel base around 61° and 52° practically disappeared.

Additionally, the observation of the sample after energization with an electron microscope led to the confirmation of the phenomenon that the electrode coating layer was physically exfoliated from the base surface. The exfoliation from the electrode surface probably led to the reduction of the coating layer weight.

INDUSTRIAL APPLICABILITY

The electrode of the present invention is suitably used in chlor-alkali electrolysis, and is particularly suitably used in the zero gap electrolysis vessel in which the membrane and the electrodes contact each other, whereby the electrode can maintain a low overvoltage over a long period of time.

The invention claimed is:

1. A method of producing an electrode for use in hydrogen generation, comprising the steps of applying onto a conductive base a mixture comprising at least one platinum compound and at least one compound selected from the group consisting of a lanthanum compound, a cerium compound and a yttrium compound, and thermally decomposing the applied mixture in the presence of an organic acid to form a coating layer on the conductive base.

2. The method of producing an electrode for use in hydrogen generation according to claim 1, wherein the amount of at least one compound selected from the group consisting of a lanthanum compound, a cerium compound and a yttrium compound falls within a range from $1/20$ to $1/2$ mol in relation to one mol of metal component in said platinum group compound, and the amount of the organic acid falls within a range from $1/20$ to 2 mol in relation to one mol of the metal component in the platinum group compound.

3. The method of producing an electrode for use in hydrogen generation according to any one of claims 1 and 2, wherein said platinum group compound is a ruthenium compound and the organic acid is oxalic acid.

4. The method of producing an electrode for use in hydrogen generation according to claim 3, wherein the thermal decomposition is conducted in an oxygen atmosphere.

5. The method of producing an electrode for use in hydrogen generation according to any one of claims 1 and 2, wherein the thermal decomposition is conducted in an oxygen atmosphere.

* * * * *